Nov. 25, 1952 — M. ABEL ET AL — 2,619,055
SOIL INJECTION MEANS
Filed Jan. 14, 1949 — 3 Sheets-Sheet 2
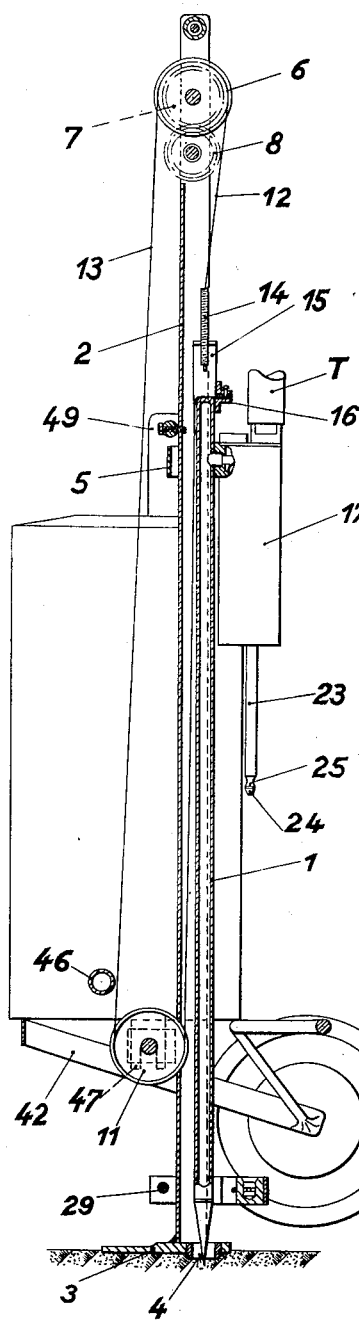
Fig. 2
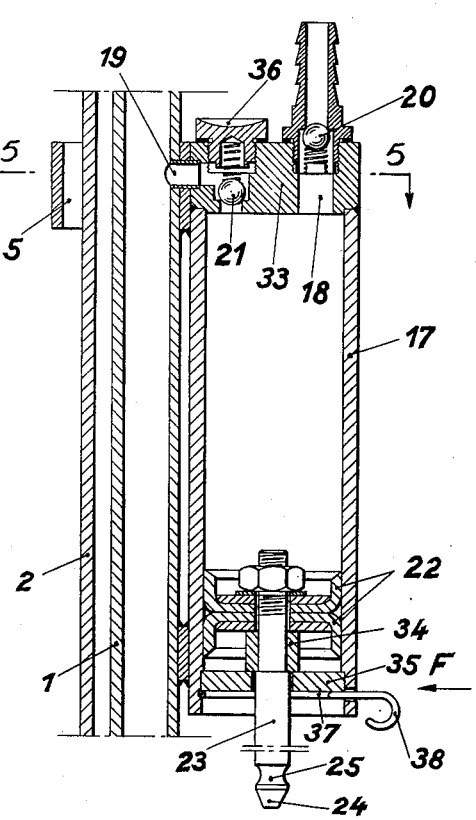
Fig. 3
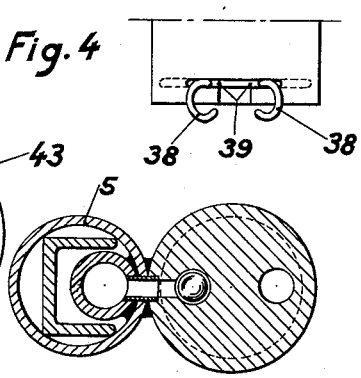
Fig. 4
Fig. 5
Inventors
Marcel Abel and Jean Lecocq

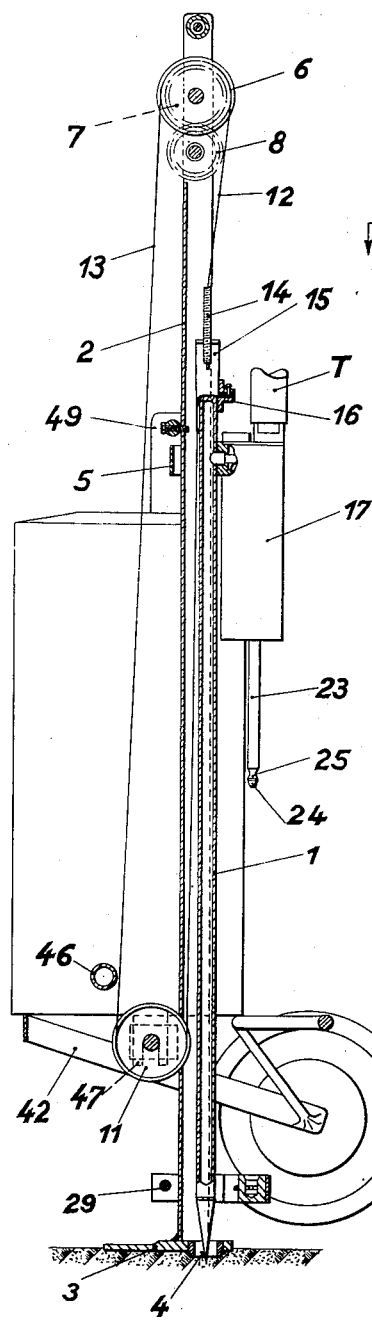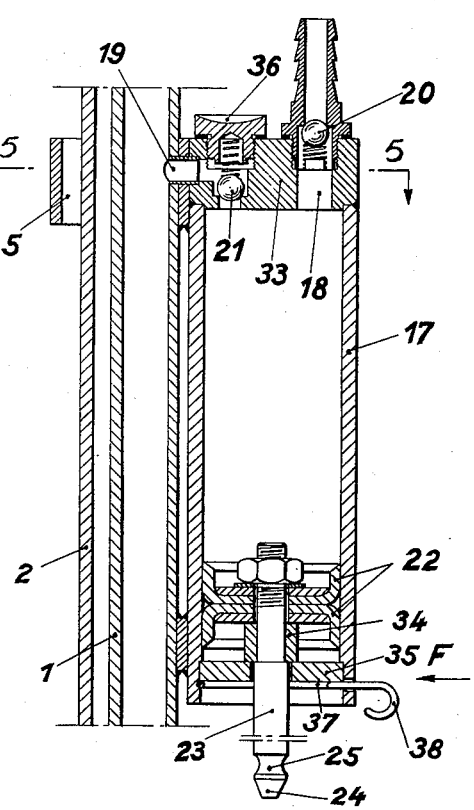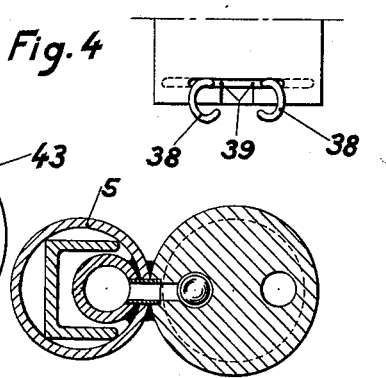

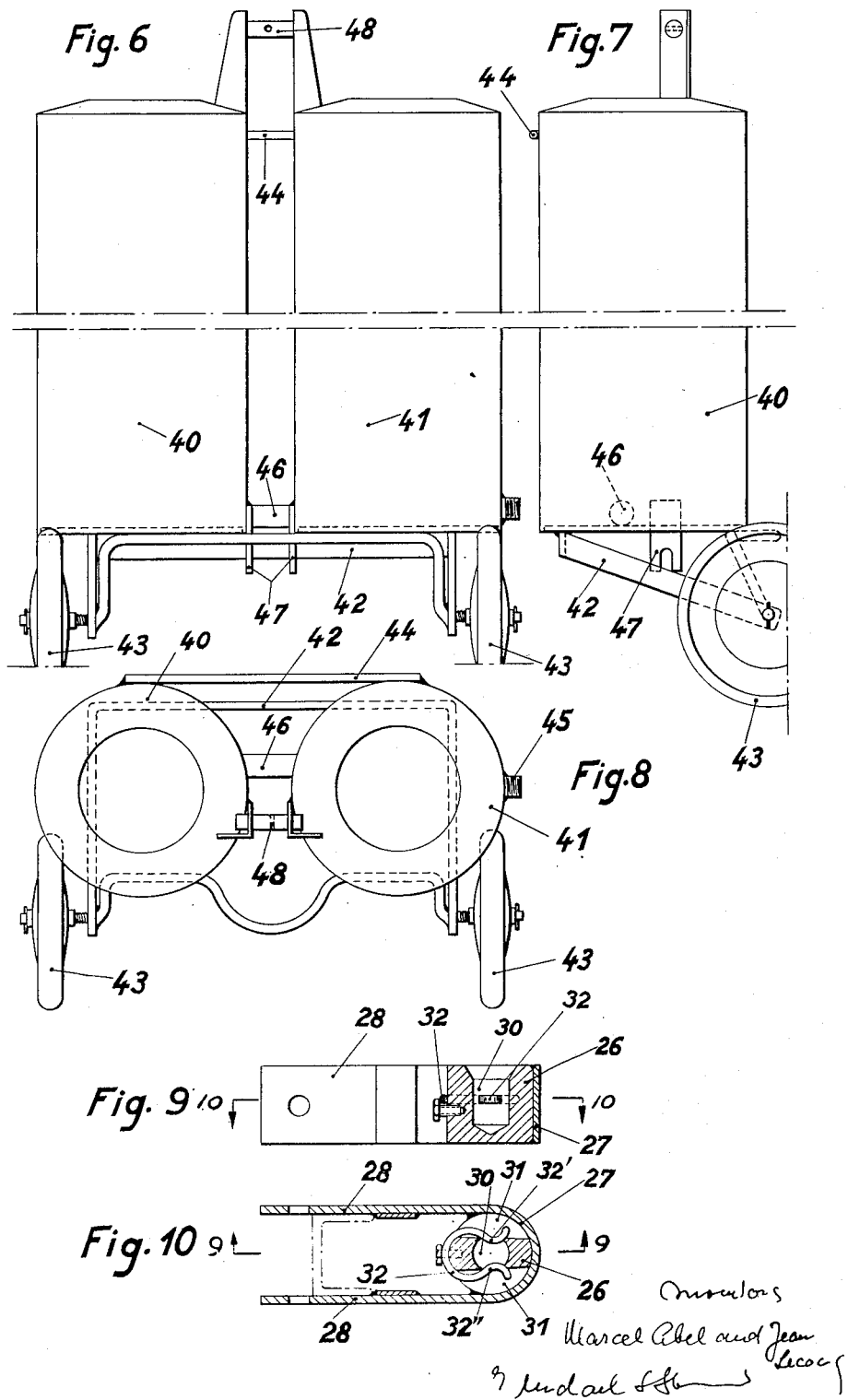

Patented Nov. 25, 1952

2,619,055

UNITED STATES PATENT OFFICE 2,619,055

SOIL INJECTION MEANS

Marcel Abel and Jean Lecocq,
La Courneuve, France

Application January 14, 1949, Serial No. 70,834
In France February 18, 1948

2 Claims. (Cl. 111—7.1)

The present invention relates to a fertilizer injector. It is an object of the invention to mount a stake of small diameter for substantially vertical movement on a fixed support which is held bearing on the soil to be treated, the stake being driven into the soil in the treatment thereof.

It is another object of the invention to provide means for automatically injecting a fluid through the stake and into the soil towards the end of the drive of the stake into the soil.

The invention and its operation will become apparent by reference to the description and accompanying drawings which illustrate, by way of example, a preferred embodiment, in which:

Fig. 1 is an elevational view of the apparatus embodying the invention;

Fig. 2 is a vertical sectional view on line 2—2 of Fig. 1;

Fig. 3 is a vertical sectional view of the pump on a larger scale;

Fig. 4 is a part elevational view of the bottom part of the pump shown in Fig. 3 and looking in the direction of the arrow F;

Fig. 5 is a horizontal sectional view on line 5—5 of Fig. 3;

Fig. 6 is an elevational view of the tanks of the apparatus;

Fig. 7 is a side view of the tanks;

Fig. 8 is a plan view of the tanks;

Fig. 9 is an elevation sectional view of the adjustable stop on line 9—9 of Fig. 10; and Fig. 10 is a horizontal sectional view of the stop, on line 10—10 of Fig. 9.

Referring to the drawings, the stake 1 is guided in a channel support 2 including at its bottom part a plate 3 resting on the soil to be treated.

The stake is guided at its lower end in a ring 4 integral with the plate 3. The diameter of the ring 4 is slightly greater than that of the stake. The top part of the stake is guided by a ring 5 soldered thereto and surrounding the support 2 (Fig. 5).

The top part of the support 2 is bifurcated and supports a pulley 6 integral with a toothed wheel 7 actuated by a pinion 8 centered in the fork and worked by a hand-crank 9. The top part of the fork is provided with a fixed handle 10 permitting the operation of the apparatus.

The support 2 is furnished with a return-pulley 11 located adjacent the bottom portion of the same.

The operation of the stake is carried out by two cables 12 and 13.

The cable 12, fixed at the top part of the stake 1 by means of a tightening member 14 screwing in a socket 15 welded on the stake is fixed in another part on the pulley 6.

The cable 13, fixed in one part in 16 at the top part of the stake 1, passes under the return pulley 11 and is fixed in another part, on the pulley 6.

It will be understood that, whatever may be the rotary direction of the crank-handle 9, one or other of the cables 12 and 13 will always operate a pull on the stake 1 to withdraw it or force it in the soil. Since the stake 1 has a small diameter and the stress is geared down by means of a pinion 8 and the toothed wheel 7, only a small force is required.

The stake injector 1 has rigidly secured thereto the barrel 17 of a lift and force pump.

This pump has a suction part 18 connected by pipe to the tank, and a delivery part 19 leading to the inside of the stake injector. These two parts are respectively provided with check valves 20 and 21.

Inside the pump-barrel a piston plunger 22 moves, the rod 23 of which is formed at its bottom part 24 with a groove 25.

This bottom part 24 cooperates with an adjustable stop placed at the bottom part of the support 2 which may be fixed at different heights.

This stop is constituted by a socket 26 welded inside a U-shaped member 27 the arms 28 of which grip the support 2 and are made fast thereto by the tightening of a bolt 29.

The socket 26 has a bore 30 and two lateral recesses 31, perpendicular to said bore and disposed in the same plane.

These recesses 31 open into the bore 30 so that a U-shaped spring 32 engaged in said recesses projects with its ends 32' and 32" into the bore 30.

When the stake 1 is driven a certain depth into the soil, the end 24 of the piston rod 23 meets the adjustable stop, engages in its bore, abuts against the ends 32' and 32" of the spring 32, and the piston 22 delivers the liquid to the inside of the stake. When the piston 22 abuts against the top head 33 of the pump-barrel 17, the end 24 of the rod 23 engages between the ends 32' and 32" and is locked therein by means of the groove 25.

As soon as the stake 1 is withdrawn from the earth, the pump-barrel rises in relation to its piston, the rod of which is locked, suction of the liquid results and this again fills up the pump-barrel until the piston abuts by means of a ring 34 against the bottom head 35 of the pump-barrel.

Thereby the rod 23 is released and the apparatus is ready for the second injection.

It will be understood that with this device the injection is not only carried out when the stake is completely driven in the soil but, on the contrary, is distributed throughout a height which corresponds to the piston stroke.

The depth of the drive of the stake may be adjusted as desired by the displacing of the movable stop along the support 2.

It should be noted that the pump-barrel may be taken apart with great ease both for allowing access to the suction and delivery valves, as for access to the piston.

The suction valve is accessible by unscrewing the suction tube and the delivery valve by unscrewing a cap 36 (Fig. 3).

Access to the piston is facilitated by the taking apart of the bottom head 35.

This last mentioned member is held in the bottom end of the pump-barrel by means of a piston-pin retainer 37 which may be removed without a tool.

For this purpose, the ends of the retainer 37 are shaped as hooks 38 each engaged in a bayonet slot 39 of the pump-barrel.

By pressing together the ends 38 of the retainer the diameter thereof is reduced, permitting removal through the bottom end of the pump-barrel.

The tank for the liquid is constituted by two cylinders 40 and 41 connected at their bottom parts by a welded frame 42 provided with two wheels 43. The two cylinders are furthermore connected at the top by a small bar 44.

One of the cylinders includes an orifice 45 connected by pipe T to the suction orifice of the pump and the two cylinders are connected by a piping 46.

The tank may either be secured to the stake support and permit the easy moving of the unit owing to two wheels 43, or be separable from the stake injector and be carried on the back to permit the injections in places difficult to access, such as vineyards.

The mounting of the tank on the support is effected by means of two fastenings 47 at the bottom part of each cylinder for engaging the ends of the shaft of the return pulley 11 and by connecting the cylinders 40 and 41 at their top by a removable strut 48 which may be fixed by means of a screw 49 to the support 2.

When the tank is fixed on the apparatus and the same is working, the wheels do not rest on the ground so that the entire weight rests on the plate 3.

The unit must be lowered for movement until the wheels rest on the ground.

Having thus described our invention, what we claim is:

1. Movable apparatus for automatically injecting liquid fertilizers into the soil, including the combination of a generally vertical support; a plate mounted on the lower portion of said support and having a hole therein providing a path for an injection stake; a hollow injection stake mounted upon said support for generally vertical movement; a pulley rotatably mounted upon the upper portion of said support; a gear keyed on the pulley and a shaft supporting both the gear and the pulley; a pinion meshing with the gear and having a hand crank for operating said pinion; a return pulley rotatably mounted at the lower portion of said support; an actuating cable connected at one end to the upper part of the stake and extending over the first mentioned pulley and down around the second pulley and upwardly again to the upper portion of said stake for lowering and raising said stake; a force pump having a pump cylinder rigid with the stake and movable therewith and internally communicating with the interior of said stake; a piston reciprocable in said pump cylinder having a piston rod extending exteriorly of said cylinder and depending therefrom; a fertilizer reservoir removably mounted on the support and having a pipe connecting the same with the interior of said pump cylinder; an adjustable stop mounted on the support below the pump engaging the lower end of the piston rod upon lowering of said stake and cylinder to move the piston and force liquid fertilizer from the cylinder; and means associated with said stop yieldably engaging the lower end of said rod upon raising movement of said stake and cylinder to move the piston and draw liquid fertilizer into the cylinder from said reservoir.

2. Movable apparatus for automatically injecting liquid fertilizers into the soil, including the combination of a generally vertical support; a plate mounted on the lower portion of said support and having a hole therein providing a path for an injection stake; a hollow injection stake mounted upon said support for generally vertical movement; means including an actuating cable connected to said stake for lowering and raising the same with respect to said support; a force pump having a pump cylinder rigid with said stake and movable therewith; a suction and delivery valve in said pump cylinder and having a delivery orifice communicating with the interior of the stake; a piston reciprocable in said pump cylinder having a piston rod extending exteriorly of said pump cylinder and depending therefrom, said piston rod having a round groove at the lower end thereof; an adjustable stop below the pump engaging the lower end of the piston rod upon lowering of said stake and cylinder to move the piston and force liquid fertilizer from cylinder; a yieldable locking spring associated with said stop in effective position to engage the round groove of the piston rod in order to retain the rod during raising movement of the stake and cylinder to move the piston and draw liquid fertilizer into the cylinder; a fertilizer reservoir removably mounted on the support; and a pipe connecting said reservoir to said pump cylinder.

MARCEL ABEL.
JEAN LECOCQ.

REFERENCES CITED

The following references are of record in the file of this patent:

UNITED STATES PATENTS

| Number | Name | Date |
|---|---|---|
| 591,216 | Griffin | Oct. 5, 1897 |
| 947,906 | Hall | Feb. 1, 1910 |
| 1,205,036 | Settevig | Nov. 14, 1916 |
| 1,456,921 | Elliott | May 29, 1923 |
| 1,979,541 | Gunn | Nov. 6, 1934 |
| 1,991,930 | Hope | Feb. 19, 1935 |
| 2,177,792 | Taylor | Oct. 31, 1939 |
| 2,222,235 | Nelson | Nov. 19, 1940 |
| 2,325,939 | Buehler | Aug. 3, 1943 |